United States Patent
Baldwin et al.

(10) Patent No.: US 11,584,808 B2
(45) Date of Patent: Feb. 21, 2023

(54) POLYMERIZATION CATALYST COMPOSITION AND METHOD OF EMPLOYING SAME

(71) Applicants: Bridgestone Corporation, Chuo-ku (JP); Bridgestone Americas Tire Operations, LLC, Akron, OH (US)

(72) Inventors: Steven M. Baldwin, Akron, OH (US); James J. Kuhel, III, Akron, OH (US)

(73) Assignees: Bridgestone Corporation, Chuo-ku (JP); Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 17/137,982

(22) Filed: Dec. 30, 2020

(65) Prior Publication Data

US 2021/0198390 A1   Jul. 1, 2021

Related U.S. Application Data

(60) Provisional application No. 62/955,217, filed on Dec. 30, 2019.

(51) Int. Cl.
  *C08F 4/54* (2006.01)
  *C08F 2/06* (2006.01)
  *C08F 36/06* (2006.01)

(52) U.S. Cl.
  CPC ............... *C08F 4/545* (2013.01); *C08F 2/06* (2013.01); *C08F 36/06* (2013.01)

(58) Field of Classification Search
  CPC ............ C08F 4/545; C08F 2/06; C08F 36/06
  See application file for complete search history.

(56) References Cited

U.S. PATENT DOCUMENTS

| | | |
|---|---|---|
| 3,297,667 A | 1/1967 | von Dohlen et al. |
| 4,242,232 A | 12/1980 | Sylvester et al. |
| 4,260,707 A | 4/1981 | Sylvester et al. |
| 4,461,883 A | 7/1984 | Takeuchi et al. |
| 4,533,711 A | 8/1985 | Takeuchi et al. |
| 4,575,538 A | 3/1986 | Hsieh et al. |
| 4,663,405 A | 5/1987 | Throckmorton |
| 4,696,984 A | 9/1987 | Carbonaro et al. |
| 4,710,553 A | 12/1987 | Carbonaro et al. |
| 4,736,001 A | 4/1988 | Carbonaro et al. |
| 4,906,706 A | 3/1990 | Hattori et al. |
| 4,990,573 A | 2/1991 | Andreussi et al. |
| 5,064,910 A | 11/1991 | Hattori et al. |
| 5,291,990 A | 3/1994 | Sejzer |
| 5,567,784 A | 10/1996 | Wieder et al. |
| 5,629,256 A | 5/1997 | Halasa et al. |
| 6,130,299 A | 10/2000 | Sone et al. |
| 6,255,416 B1 | 7/2001 | Sone et al. |
| 6,437,205 B1 | 8/2002 | Miller et al. |
| 6,482,930 B1 | 11/2002 | Kwag et al. |
| 6,521,726 B1 | 2/2003 | Kimura et al. |
| 6,566,478 B1 | 5/2003 | Henning et al. |
| 6,747,085 B2 | 6/2004 | Sone et al. |
| 6,897,270 B2 | 5/2005 | Ozawa et al. |
| 7,008,899 B2 | 3/2006 | Luo et al. |
| 7,094,849 B2 | 8/2006 | Luo et al. |
| 7,153,920 B2 | 12/2006 | Kems et al. |
| 7,288,611 B2 | 10/2007 | Jiang et al. |
| 7,396,889 B2 | 7/2008 | Robert |
| 7,741,418 B2 | 6/2010 | Luo et al. |
| 7,825,201 B2 | 11/2010 | Luo et al. |
| 7,902,309 B2 | 3/2011 | Luo et al. |
| 8,309,657 B2 | 11/2012 | Matsushita et al. |
| 8,436,111 B2 | 5/2013 | Pawlow et al. |
| 8,981,020 B2 | 3/2015 | Luo et al. |
| 9,249,244 B2 | 2/2016 | McCauley et al. |
| 9,353,205 B2 | 5/2016 | Qin et al. |
| 9,505,859 B2 | 11/2016 | McCauley et al. |
| 9,546,227 B2 | 1/2017 | McCauley et al. |
| 9,650,456 B2 | 5/2017 | McCauley et al. |
| 9,676,881 B2 | 6/2017 | Ambe et al. |
| 9,796,800 B2 | 10/2017 | McCauley et al. |
| 10,202,474 B2 | 2/2019 | Qin |
| 10,766,979 B2 | 9/2020 | Ricci et al. |
| 2017/0073443 A1* | 3/2017 | Qin ............... C08F 136/06 |
| 2017/0291977 A1 | 10/2017 | Qin et al. |
| 2019/0276570 A1 | 9/2019 | McCauley et al. |
| 2022/0010105 A1* | 1/2022 | Oh ............... C08K 5/5333 |

FOREIGN PATENT DOCUMENTS

| | | |
|---|---|---|
| EP | 1367069 A1 | 12/2003 |
| JP | S44-27812 B | 11/1969 |

OTHER PUBLICATIONS

Z. Zhang et al., "Polymerization of 1,3-Conjugated Dienes with Rare-Earth Metal Precursors," Struct Bond (2010) 137, pp. 49-108 (Springer-Verlag Berlin Heidelberg; 2010).

(Continued)

*Primary Examiner* — Catherine S Branch
(74) *Attorney, Agent, or Firm* — Meredith E. Hooker; Nathan T. Lewis

(57) ABSTRACT

Without significantly impacting monomer conversion, the cis-1,4 mer content of conjugated diene mer in polymers can be increased by adding one or more Lewis bases to a catalyst composition that includes a Group 3 metal atom-containing carboxylate. This effect can be seen even at above average monomer concentrations.

18 Claims, No Drawings

(56) References Cited

OTHER PUBLICATIONS

R.P. Quirk et al., "Polymerization of butadiene using neodymium versatate-based catalyst systems: preformed catalysts with SiCl4 as halide source," Polym. Int., 2000, vol. 49, pp. 751-756 (John Wiley & Sons Ltd.; New York, NY).
H. Sugiyama et al., "Preparation of an Active Neodymium Catalyst for Regioselective Butadiene cis-Polymerization Supported by a Dianionic Modification of the 2,6-Diiminopyridine Ligand," Organometallics, 2004, 23 (21), pp. 5054-5061 American Chemical Society; Washington, D.C.).
Z. Shen et al., "The Characteristics of Lanthanide Coordination Catalysts and the cis-Polydienes Prepared There-with," J. Polym. Sci.: Polym. Chem. Ed., vol. 18, pp. 3345-3357 (Feb. 1980; John Wiley & Sons, Inc.; New York, NY).
H.L. Hsieh et al., "Polymerization of Butadiene and Isoprene with Lanthanide Catalysts; Characterization and Properties of Homopolymers and Copolymers," Rubber Chem. & Tech., 1985, vol. 58, pp. 117-145 (presented at a May 1984 conference; American Chemical Society; Washington, D.C.).
R.P. Quirk et al., "Butadiene polymerization using neodymium versatate-based catalysts: catalyst optimization and effects of water and excess versatic acid," Polymer, 2000, 41, pp. 5903-5908 (Elsevier Science Ltd.; London, UK).
L. Friebe et al., "Polymerization of 1,3-Butadiene Initiated by Neodumium Versatate/Diisobutylaluminium Hydride/Ethylaluminium Sesquichloride: Kinetics and Conclusions About the Reaction Mechanism," Macomol. Chem. Phys., 2002, 203, pp. 1055-1064 (Wiley-VCH Verlag GmbH & Co.; Weinheim, Germany).

\* cited by examiner

POLYMERIZATION CATALYST COMPOSITION AND METHOD OF EMPLOYING SAME

CROSS REFERENCE TO RELATED APPLICATION

This application claims the benefit of U.S. provisional appl. No. 62/955,217, filed 30 Dec. 2019, the disclosure of which is incorporated herein by reference.

BACKGROUND INFORMATION

Various natural and synthetic elastomeric materials are used in the manufacture of vulcanizates such as, e.g., tire components. Some of the most commonly employed synthetic materials include high-cis polybutadiene, often made by processes employing catalysts, and substantially random styrene/butadiene interpolymers, often made by processes employing free radical or anionic initiators.

Cis-1,4-polydienes having very high cis contents give a greater ability to undergo strain-induced crystallization and lower hysteresis. Vulcanizates made from these polymers tend to exhibit superior physical properties such as higher tensile strength, higher abrasion resistance, better cold weather performance, etc. The best properties tend to result from cis-1,4-polydienes having very high cis contents, particularly those which also have narrow molecular weight distributions, i.e., $M_w/M_n$.

Group 3 (including lanthanides) metal complexes can be used in conjunction with, inter alia, an alkylating agent and a halogen source to provide catalyst compositions. Such compositions are known to be useful for producing polymers having high amounts of cis-1,4 linkages, i.e., above 95% but less than 99%, typically less than 98% and often less than 97%.

The use of Lewis bases to assist in solubilizing Group 3 metal-containing complexes, particularly Nd, while also increasing monomer conversion and cis-1,4 linkage content has been described in U.S. Pat. Nos. 4,461,883, 4,533,711, 4,906,706, 5,064,910, etc., while the use of that same class of materials to modulate bulk polymerizations has been described in U.S. Pat. Nos. 7,741,418, 7,825,201, 7,902,309, 9,353,205, etc.

The catalytic activity (toward olefins) of Nd complexes which include "a ligand containing an acidic proton" has been taught as having been improved by the presence of organic bases such as primary, secondary or tertiary amines; see U.S. Pat. No. 4,575,538.

The use of morpholine compounds to impact cis-1,4 linkages in polymers made using in catalysts based on Group 3 metal-containing complexes has been described in U.S. Pat. No. 7,902,309 and U.S. Pat. Publ. No. 2017/0291977.

Lanthanide-based catalyst systems, especially those which include an aluminoxane compound as a component, can give excessively fast polymerization rates when applied to bulk polymerization of conjugated dienes. This issue was substantially overcome in a process described in, e.g., U.S. Pat. No. 9,796,800, albeit at a significant detriment to conversion.

Being able to increase the cis-1,4 linkages in polymers made by processes employing lanthanide complex-containing catalyst compositions remains desirable. Compositions and techniques employing compounds that meet regulatory requirements and that provide predictable, controllable conditions and commercially acceptable polymerization rates are particularly desirable.

SUMMARY

A Lewis bases can be used as an ingredient of a catalyst composition which includes a Group 3 metal carboxylate. The catalyst composition can be used in polymerizations of ethylenically unsaturated hydrocarbon monomers such as polyenes and, particularly, conjugated dienes.

In other aspects are provided a catalyst composition that includes a neodymium (Nd) carboxylate and no more than 10 equivalents of a Lewis base. Preferred are those catalyst compositions which include one or more organoaluminum compounds, particularly a trihydrocarbylaluminum compound, optionally in combination with a dihydrocarbylaluminum hydride.

Methods of making the foregoing catalyst composition also are provided.

In a still further aspect is provided a process of polymerizing ethylenically unsaturated hydrocarbon monomers. The method involves contacting the monomers with the aforedescribed catalyst composition. The ethylenically unsaturated hydrocarbon monomers advantageously can include one or more types of polyene, particularly conjugated dienes.

In certain embodiments, the polymerization process can result in preferential incorporation of conjugated diene mer in a cis-1,4 configuration, even when elevated monomer concentrations are employed, perhaps by moderating (i.e., lowering) the peak polymerization temperature. In these and other embodiments, the amount of monomer in the polymerization vessel advantageously can be increased to 15%, 20%, 25%, or even 30% (all w/w) without an unacceptably high polymerization temperature, which can negatively impact cis mer content.

Also provided are compositions, including vulcanizates, that include particulate fillers and the resulting polymers, certain embodiments of which may also include terminal functionality, as are methods of providing and using such compositions.

Other aspects of the invention will be apparent to the ordinarily skilled artisan from the detailed description that follows. To assist in understanding that description, certain defini-tions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" and "mer unit" both mean that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"substituted" means containing a heteroatom or functionality (e.g., hydrocarbyl group) that does not interfere with the intended purpose of the group in question;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"lanthanide metal" means any element having an atomic number of 57-71 inclusive, as well as mixtures of rare earth elements obtained from monazite sand, often referred to as "didymium";

"Group 3 metal" means Sc, Y or a lanthanide metal;

"phr" means parts by weight (pbw) per 100 pbw rubber;

"radical" means the portion of a molecule that remains after reacting with another molecule, regardless of whether any atoms are gained or lost as a result of the reaction;

"aryl" means a phenyl or polycyclic aromatic radical;

"aralkyl" means an alkyl radical that includes an aryl substituent, e.g., a benzyl group;

"non-coordinating anion" means a sterically bulky anion that does not form coordinate bonds with, for example, the active center of a catalyst system due to steric hindrance;

"non-coordinating anion precursor" means a compound that is able to form a non-coordinating anion under reaction conditions;

"terminus" means an end of a polymeric chain; and

"terminal moiety" means a group or functionality located at a terminus.

Throughout this document, all values given in the form of percentages are weight percentages unless the surrounding text explicitly indicates a contrary intention and recited numerical limitations include an appropriate degree of precision based on the number of significant places used (e.g., "up to 5.0" can be read as setting a lower absolute ceiling than "up to 5").

The relevant portion(s) of any specifically referenced patent and/or published patent application are incorporated herein by reference.

DETAILED DESCRIPTION OF ILLUSTRATIVE EMBODIMENTS

As apparent from the foregoing, the catalyst composition can be used to polymerize one or more types of polyene, optionally but in some respects preferably which include at least one type of conjugated diene.

The resulting polymer can be elastomeric, including mer units that themselves include ethylenic unsaturation. Mer units that include ethylenic unsaturation can result from polymerization of polyenes, particularly dienes and trienes (e.g., myrcene). Illustrative polyenes include $C_4$-$C_{30}$ dienes, preferably $C_4$-$C_{12}$ dienes. Preferred among these are conjugated dienes such as, but not limited to, 1,3-butadiene, 1,3-pentadiene, 1,3-hexadiene, 1,3-octadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like. The polymer can include mer units of just one type of polyene or multiple types.

Polymers that have overall 1,2-microstructures of no more than 50%, preferably no more than 35%, based on total polyene content are considered to be "substantially linear." For certain end use applications, however, keeping the content of 1,2-linkages much lower can be desirable. Where maximizing the cis-1,4-linkage content is desirable, the amount of such vinyl linkages preferably are less than 10%, less than 7%, less than 5%, less than 4%, less than 3%, less than ~2%, no more than ~1%, and even no more than ~0.5%. (The foregoing are numerical (molar) percentages, based on the number of polyene mer units in a vinyl configuration relative to the total number of polyene mer units. Microstructure characteristics typically are determined by IR spectroscopy, the details of which are familiar to ordinarily skilled artisans.)

Those polyene mer not incorporating into a polymer chain in a 1,2-vinyl configuration can have either a cis or trans isomeric configuration. Polymers that have high cis-1,4-linkage contents, which are desirable for certain end use applications, can be difficult or inefficient to achieve via free radical or anionic (living) polymerizations and, therefore, commonly are prepared by processes using catalysts, as opposed to the initiators employed in living polymerizations.

The present process can provide polymers with diene mer having a cis-1,4-linkage content that is at least 0.2, at least 0.4, at least 0.6, or even at least 0.8 percentage points higher than a polymer made from an otherwise identical catalyst composition but which does not include the Lewis base compound. (Cis-1,4 linkages are relative to total diene mer and are numerical percentages based on total number (moles) of such mer.) In certain embodiments, the resulting polymers can be cis-1,4-polydienes having a cis-1,4-linkage content greater than ~97%, at least ~97.5%, at least ~98%, and even ~98.5%.

The number average molecular weight ($M_n$) of a polymer produced according to the disclosed methods typically is such that a quenched sample exhibits a gum Mooney viscosity ($ML_{1+4}/100°$ C.) of from ~2 to ~150, more commonly from ~2.5 to ~125, even more commonly from ~5 to ~100, and most commonly from ~10 to ~75; the foregoing generally corresponds to a $M_n$ of from ~2,000 to ~500,000 Daltons, commonly from ~5,000 to ~300,000 Daltons, more commonly from ~10,000 to ~250,000 Daltons, and most commonly from ~15,000 to ~225,000 Daltons. The resulting interpolymer typically has a molecular weight distribution of from 1 to 10, commonly from 1.5 to 7.5, and more commonly from 2 to 5. (Both $M_n$ and $M_w$ can be determined by GPC using polystyrene standards for calibration and appropriate Mark-Houwink constants.)

The foregoing types of polymers can be made by solution polymerization, which affords exceptional control of properties as randomness, microstructure, etc. Solution polymerizations have been performed since about the mid-20th century, so the general aspects thereof are known to the ordinarily skilled artisan; nevertheless, certain aspects are provided here for convenience of reference.

Suitable solvents include those organic compounds that do not undergo polymerization or incorporation into propagating polymer chains (i.e., are inert toward and unaffected by the catalyst composition) and preferably are liquid at ambient temperature and pressure. Examples of suitable organic solvents include hydrocarbons with relatively low boiling points such as aromatic hydrocarbons and (cyclo) aliphatic hydrocarbons. Exemplary polymerization solvents include various $C_5$-$C_{12}$ cyclic and acyclic alkanes (e.g., n-pentane, n-hexane, n-heptane, n-octane, n-nonane, n-decane, isopentane, isohexanes, isooctanes, 2,2-dimethylbutane, cyclo-pentane, cyclohexane, methylcyclopentane, methylcyclohexane, etc.) as well as their alkylated derivatives, certain liquid aromatic compounds (e.g., benzene, toluene, xylenes, ethylbenzene, diethylbenzene, and mesitylene), petroleum ether, kerosene, petroleum spirits, and mixtures thereof. Other potentially suitable organic compounds that can be used as solvents include high-boiling hydrocarbons of high molecular weights such as paraffinic oil, aromatic oil, or other hydrocarbon oils commonly used to oil-extend polymers. Ordinarily skilled artisans are aware of other useful solvent options and combinations.

The description that follows employs the term "catalyst composition," which is intended to encompass a simple mixture of ingredients, a complex of various ingredients that results from physical or chemical forces of attraction, a chemical reaction product of some or all of the ingredients, or a combination of the foregoing.

Useful catalyst compositions include a compound that includes a Group 3 metal atom (typically a metal complex, preferably a lanthanide metal complex), a catalyst activator and a halogen source (where the activator does not itself contain a halogen atom). The Group 3 metal atom-containing compound can be provided pre-made or can be generated in situ.

Each component of the catalyst composition is discussed separately in the following paragraphs.

The Group 3 metal atom can be in any of a variety of oxidation states that include, but are not necessarily limited to, 0, +2, +3, and +4. In one embodiment, a Group 3 metal atom in the +3 oxidation state can be employed, optionally but preferably bonded to or associated with three atoms or groups, i.e., a trivalent compound. In these and other embodiments, the Group 3 metal atom can be a lanthanide metal atom, particularly Nd or Gd.

Preferred Group 3 metal atom-containing compounds are carboxylates such as formates, acetates, (meth)acrylates, valerates, gluconates, citrates, fumarates, lactates, maleates, oxalates, 2-ethylhexanoates, neodecanoates (i.e., carboxylates made from trialkyl carboxylic acids such as Versatic™ acid, available from Momentive Specialty Chemicals Inc.), naphthenates, stearates, oleates, benzoates, picolinates and the like.

The catalyst composition also includes an activator, generally an alkylating agent, which can be considered to be an organometallic compound that can transfer hydrocarbyl groups to another metal. These agents typically are organometallic compounds of electropositive metals such as Groups 1, 2, and 3 metals. Exemplary alkylating agents include organoaluminum compounds such as those having the general formula $AlR^1_oX_{3-o}$ where o is an integer of from 1 to 3 inclusive; each $R^1$ independently is a monovalent organic group, which may contain heteroatoms such as N, O, B, Si, S, P, and the like, connected to the Al atom via a C atom; and each X independently is H, a halogen atom, a carboxylate group, an alkoxide group, or an aryloxide group. In one or more embodiments, each R' independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing from a single C atom, or the appropriate minimum number of C atoms to form the group, up to about 20 C atoms. These hydrocarbyl groups may contain heteroatoms including, but not limited to, N, O, B, Si, S, and P atoms. Non-limiting species of organoaluminum compounds within this general formula include trihydrocarbylaluminum compounds such as trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum;

dihydrocarbylaluminum hydrides such as diethylaluminum hydride, di-n-propylaluminum hydride, diisopropylaluminum hydride, di-n-butylaluminum hydride, diisobutyl-aluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride; and hydrocarbylaluminum dihydrides such as ethylaluminum dihydride, n-propylaluminum dihydride, isopropylaluminum dihydride, n-butylaluminum dihydride, isobutylaluminum dihydride, and n-octylaluminum dihydride. Numerous other species of organoaluminum compounds and other activators can be found in, for example, U.S. Pat. No. 9,796,800.

Alkylating agents which include a mixture of trihydrocarbylaluminum, dihydrocarbylaluminum hydride, and/or hydrocarbylaluminum dihydride are contemplated. Those which include a trihydrocarbylaluminum are preferred.

The catalyst composition also includes a halogen source, a term that includes any substance that includes at least one labile halogen atom. At least a portion of the halogen source can be provided by the aforedescribed activator (alkylating agent) when one of its components contain at least one labile halogen atom.

At least a portion of the halogen source can be in the form of one or more separate and distinct halogen-containing compounds. Various compounds, or mixtures thereof, that contain one or more labile halogen atoms can be employed as the halogen source, with those that have good solubility in hydrocarbon liquids (solvents) being preferred, although those with limited solubility can be suspended in a polymerization system to form the catalytically active species.

Useful halogen-containing compounds that can be employed as at least a portion of the halogen source include, but are not limited to, elemental halogens; mixed halogens such as iodine monochloride, iodine monobromide, iodine trichloride, iodine pentafluoride and the like; hydrogen halides such as HF, HCl, HBr and HI; organic halides such as t-butyl chloride or bromide, allyl chloride or bromide, benzyl chloride or bromide, chloro- or bromo-di-phenylmethane, triphenylmethyl chloride or bromide, benzylidene chloride or bromide, any of variety of alkyltrichlorosilanes and dialkyldichlorosilanes, benzoyl chloride or bromide, propionyl chloride or bromide, methyl chloroformate, methyl bromoformate and the like; inorganic halides such as $PCl_3$, $PBr_3$, $PCl_5$, $POCl_3$, $POBr_3$, $BCl_3$, $BBr_3$, $BF_3$, $SiF_4$, $SiCl_4$, $SiBr_4$, $SiI_4$, $AsCl_3$, $AsBr_3$, $AsI_3$, $SeCl_4$, $SeBr_4$, $TeCl_4$, $TeBr_4$, $TeI_4$ and the like; halides of metals (in any of a variety of oxi-dations states) such Sn, Al, Sb, Al, Ga, In, Ti, Zn and the like; as well as organometallic halides such as any of a variety of dialkylaluminum chlorides, bromides and fluorides, alkylaluminum dichlorides, dibromides and difluorides, alkylaluminum sesquichlorides, alkylmagnesium chlorides, bromides and iodides, phenylmagnesium chloride or bromide, benzylmagnesium chloride, trialkyltin chlorides and bromides, dialkyltin dichlorides and dibromides, and the like.

The catalyst system optionally can include a compound that contains a non-coordinating anion or a non-coordinating anion precursor. A non-coordinating anion is a sterically bulky anion that does not form coordinate bonds with, for example, the active center of a catalyst system due to steric hindrance. Potentially useful non-coordinating anions include, but are not limited to, tetraarylborate anions and fluorinated tetraarylborate anions. (The nature of the countercation is not particularly important.) Examples of compounds containing a non-coordinating anion include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl)phenyl]borate.

A non-coordinating anion precursor is a compound that is able to form a non-coordinating anion under reaction conditions. Useful non-coordinating anion precursors include, but are not limited to, triarylboron compounds such as a pentafluorophenyl or 3,5-bis(trifluoromethyl)phenyl group.

A compound containing a non-coordinating anion, or a non-coordinating anion precursor, can be employed in lieu of some or all of the aforedescribed halogen source.

Catalyst compositions of the type just described have very high catalytic activity for polymerizing polyenes such as conjugated dienes into stereospecific polymers over a wide range of concentrations and ratios, although polymers having the most desirable properties typically are obtained from systems that employ a relatively narrow range of concentrations and ratios of ingredients. Further, the catalyst composition ingredients are believed to interact to form an active catalyst species, so the optimum concentration for each ingredient can depend on the concentrations of the other ingredients. The following molar ratios are considered to be relatively exemplary for a variety of different systems based on the foregoing ingredients:

alkylating agent to Group 3 metal atom-containing compound: from ~1:1 to ~1000:1, commonly from ~2:1 to ~500:1, typically from ~5:1 to ~200:1;

halogen-containing compound to Group 3 metal atom-containing compound: from ~1:2 to ~20:1, commonly from ~1:1 to ~10:1, typically from ~2:1 to ~6:1 (with the first number in each representing the halogen atoms in the halogen source to the mole of lanthanide atoms in the Group 3 metal atom-containing compound); and non-coordinating anion or non-coordinating anion precursor to Group 3 metal atom-containing: from ~1:2 to ~20:1, commonly from 3:4 to ~10:1, typically from ~1:1 to ~6:1.

The molecular weight of polymers produced with a catalyst composition that includes a Group 3 metal atom-containing compound can be controlled by adjusting the amount of Group 3 metal atom-containing compound used and/or the amounts of co-catalyst compound concentrations within the catalyst composition; polymers having a wide range of molecular weights can be produced in this manner. In general, increasing the metallic complex and co-catalyst concentrations reduces the molecular weight of resulting polymers, although very low molecular weight polymers (e.g., liquid polydienes) require extremely high catalyst concentrations. Typically, this necessitates removal of catalyst residues from the polymer to avoid adverse effects such as retardation of the sulfur cure rate.

A catalyst composition that includes a Group 3 metal atom-containing compound can be formed using any of the following methods:

(1) In situ. The catalyst ingredients are added to a solution containing monomer and solvent (or simply bulk monomer). The addition can occur in a stepwise or simultaneous manner. In the case of the latter, the activator preferably is added first followed by the Group 3 metal atom-containing compound.

(2) Pre-mixed. The ingredients can be mixed outside the polymerization system, generally at a temperature of from about −20° to ~80° C., before being introduced to the monomer(s).

(3) Pre-formed in the presence of monomer(s). The catalyst ingredients are mixed in the presence of a small amount of monomer(s) at a temperature of from about −20° to ~80° C. The amount of monomer(s) can range from ~1 to ~500 moles, commonly from ~5 to ~250 moles, typically from ~10 to ~100 moles, per mole of the Group 3 metal atom-containing compound. The resulting catalyst composition is added to the remainder of the monomer(s) to be polymerized.

(4) Two-stage procedure.
  (a) The activator is combined with the Group 3 metal atom-containing compound in the absence of monomer or in the presence of a small amount of monomer(s) at a temperature of from about −20° to ~80° C.
  (b) The foregoing mixture and the remaining components are charged in either a stepwise or simultaneous manner to the remainder of the monomer(s) to be polymerized.

The Lewis base can be kept separate from the remainder of the catalyst composition prior to the time that polymerization is begun. In other words, the Lewis base can be added to a preformed catalyst composition when it is introduced to a polymerization vessel or can be added as a separate component of the polymerization system in which a catalyst composition is employed. In other embodiments, the Lewis base can be added during initial formation of the catalyst composition.

When a solution of one or more of the catalyst ingredients is prepared outside the polymerization system in the foregoing methods, an organic solvent or carrier preferably is employed; useful organic solvents include those mentioned previously. In other embodiments, one or more monomers can be used as a carrier or the catalyst ingredients can be employed neat, i.e., free of any solvent of other carrier.

Where 1,3-butadiene is polymerized in the presence of a catalyst composition of the type just described, the resulting polydienes can have a cis-1,4-linkage content of at least 95%, at least 96%, at least 97%, at least 98%, or at least 99%, where the percentages are based upon the number of diene mer in cis-1,4 configuration relative to the total number of diene mer. As mentioned previously, such polymers can have a 1,2-linkage content that is less than 5%, less than 4%, less than 3%, less than 2% or even less than 1%. (The remaining diene mer will have a trans-1,4 configuration.)

Inclusion of a Lewis base in the catalyst composition can increase the cis-1,4-linkage content of the resulting polymer. Specifically, inclusion of such a compound in a catalyst composition can result in a polydiene that has a cis-1,4-linkage content even higher than that produced by a similar catalyst composition not including it. The amount of increase can be as high as 0.5, 1, 1.5, 2, 2.5, 3, or even 3.5 percentage points, depending primarily on the amount of cis-1,4 configured mer otherwise produced by the particular equivalent catalyst composition.

Advantageously, the amount of Lewis base compound(s) employed need not be as high as that used in many previously described catalyst compositions. The molar ratio of Lewis base(s) to Group 3 metal atom-containing compound can be as high as 10:1, although several of the species can be employed at far lower molar ratios such as no more than 15:2, no more than 6:1, no more than 5:1, no more than 4:1, no more than 7:2, no more than 3:1, no more than 5:2, no more than 2:1, no more than 3:2 and no more than 1:1. In some embodiments, this ratio can be even lower, e.g., no more than each of 4:5, 3:4, 2:3, 1:2, 1:3, 1:4, 1:5, 1:6, 1:7, 1:8, 1:9, or 1:10; in other embodiments, this ratio can be as low as no more than each of 1:20, 1:30 or even 1:40.

The effect on the aforedescribed catalyst compositions has been noted with both N- and O-donor Lewis bases, both protic and aprotic Lewis bases, and with chelating and non-chelating Lewis bases. Representative, non-limiting Lewis bases which can be used in these catalyst compositions include 2-ethylhexanoic acid (EHA), tri(nonylphenyl) phosphite (TNPP), t-butylcatechol (TBC), acyclic and cyclic oligomeric oxolanyl alkanes (see U.S. Pat. No. 4,429,091 and patents citing it), and a group of compounds represented by the general formula

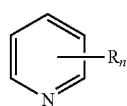

(I)

where R represents a $C_1$-$C_4$ alkyl group and n is an integer of from 0 to 5. Advantageously, pyridine and many substituted morpholine compounds are readily available and acceptable under many regulatory standards.

With respect to general formula (I)-type compounds, this ration can depend significantly on the particular general formula (I)-type compound employed. For example, where n=0 (pyridine), the ratio can be as 20:1 without decreasing monomer conversion percentage by a (commercial scale) unreasonable amount. However, where n=2 and R=methyl (i.e., 2,6-dimethylpyridine), the same ratio preferably is kept lower, i.e., at 1:1 or below.

In general, an acceptable ratio of general formula (I)-type compound relative to the amount of Group 3 metal atom-containing compound can be determined from a set of experimental data, employing similar polymerization conditions; specifically, those ratios having data in which the following formula (II) yields a result greater than or equal to 0 are good candidates for use:

$$z(x_1-x_0)-(y_0-y_1) \qquad (II)$$

where 0 represents a polymerization where no general formula (I)-type compound is employed and 1 represents a polymerization where a general formula (I)-type compound is employed, x represents the cis-1,4 linkage of the resulting polymer, and y represents the percentage of monomer conversion, and z is a number of from 13 to 20, preferably of from 15 to 17. Preferred z values are at least 15, at least 15.5, at least 16, at least 16.5, and 17 or more.

The variable R in general formula (I) represents a $C_1$-$C_4$ alkyl group, preferably a $C_1$-$C_2$ alkyl group, and most preferably a methyl group. The n variable preferably is 0 or an even number, preferably 2. As the number and/or size of the R groups increases, the negative impact monomer conversion tends to outweigh the benefit of increasing cis-1,4 linkage percentages. Where n is an even numbered integer, preference can be given to those general formula (I)-type compounds which have a plane of symmetry, e.g., a 2,6-dialkylpyridine.

In one or more embodiments, some or all of the catalyst composition can be supported on an inert carrier. The support can be a porous solid such as talc, a sheet silicate, an inorganic oxide or a finely divided polymer powder. Suitable inorganic oxides are oxides of elements from any of Groups 2-5 and 13-16. Exemplary supports include $SiO_2$, aluminum oxide, and also mixed oxides of the elements Ca, Al, Si, Mg or Ti and also corresponding oxide mixtures, Mg halides, styrene/divinylbenzene copolymers, polyethylene or polypropylene.

The production of polymers such as cis-1,4-polydiene (or interpolymers that include cis-1,4-diene mer) is accomplished by polymerizing conjugated diene monomer(s) in the presence of a catalytically effective amount of a catalyst composition as described above. The total catalyst concentration to be employed in the polymerization mass depends on the interplay of multiple factors such as the purity of ingredients, the polymerization temperature, the polymerization rate and conversion desired, and the molecular weight desired. Accordingly, a specific total catalyst concentration cannot be definitively set forth except to say that catalytically effective amounts of the respective catalyst ingredients should be used. The amount of the Group 3 metal atom-containing compound used generally ranges from ~0.005 to ~2 mmol, commonly from ~0.01 to ~1 mmol, typically from ~0.02 to ~0.5 mmol per 100 g monomer. All other ingredients generally can be added in amounts based on the amount of Group 3 metal atom-containing compound; see the various ratios set forth above.

Polymerization preferably is carried out in one or more organic solvents of the type(s) set forth above, i.e., as a solution polymerization (where both the monomer(s) and the polymers formed are soluble in the solvent) or precipitation polymerization (where the monomer is in a condensed phase but the polymer products are insoluble). The catalyst ingredients preferably are solubilized or suspended in the organic liquid, and additional solvent (beyond that used in preparing the catalyst composition) usually is added to the polymerization system; the additional solvent(s) may be the same as or different from the solvent(s) used in preparing the catalyst composition. In one or more embodiments, the solvent content of the polymerization mixture may be more than 20%, more than 50%, or even more than 80% (by wt.) of the total weight of the polymerization mixture.

The concentration of monomer present at the beginning of the polymerization generally ranges from ~3 to ~80%, commonly from ~4 to ~40%, more commonly from ~4 to ~30%, and typically from ~5% to ~25% (all w/w). Depending on the particular equipment and conditions employed, other subranges within the broadest range can be used, for example, from ~15 to ~35%, from ~10 to ~25%, from ~7 to ~30%, and from ~12 to ~36% (all w/w). Within the foregoing ranges, minimum monomer concentrations can be any of 8%, 9%, 10%, 11%, 12%, 13%, 14%, 15%, 16%, 17%, 18%, 19% and even 20% (all w/w).

In certain embodiments, a bulk polymerization system that includes no more than a minimal amount of solvent can be used, i.e., a bulk polymerization process where one or more of the monomers act(s) as the solvent; examples of potentially useful bulk polymerization processes are disclosed in U.S. Pat. No. 7,351,776. In a bulk polymerization, the solvent content of the polymerization mixture may be less than ~20%, less than ~10%, or even less than ~5% (by wt.) of the total weight of the polymerization mixture. The polymerization mixture even can be substantially devoid of solvent, i.e., contain less than that amount of solvent which otherwise would have an appreciable impact on the polymerization process.

The polymerization can be conducted in any of a variety of reaction vessels. For example, solution polymerizations can be conducted in a conventional stirred-tank reactor. Bulk polymerizations also can be conducted in a stirred-tank reaction if the monomer conversion is less than ~60%. Where monomer conversion is higher than ~60%, which typically results in a highly viscous polymer cement (i.e., mixture of solvent, polymers and any remaining monomer(s)), bulk polymerization can be conducted in an elongated reactor in which the viscous cement is driven by, for example, piston or self-cleaning single- or double-screw agitator.

All components used in or during the polymerization can be combined in a single vessel (e.g., a stirred-tank reactor), and the entirety of the polymerization process can be conducted in that vessel. Alternatively, two or more of the ingredients can be combined outside the polymerization vessel and transferred to another vessel where polymerization of the monomer(s), or at least a major portion thereof, can be conducted.

The polymerization can be carried out as a batch, continuous, or semi-continuous process. The conditions under which the polymerization proceeds can be controlled to maintain the temperature of the polymerization mixture in a range of from −10° to ~200° C., commonly from ~0° to ~150° C., and typically from ~20° to ~100° C. Heat generated by the polymerization can be removed by external cooling by a thermally controlled reactor jacket and/or internal cooling (by evaporation and condensation of the monomer through use of a reflux condenser connected to the reactor). Also, conditions may be controlled to conduct the polymerization under a pressure of from ~0.01 to ~5 MPa, commonly from ~0.05 to ~3 MPa, typically from ~0.1 to ~2 MPa; the pressure at which the polymerization is carried out can be such that the majority of monomers are in the liquid phase. In these or other embodiments, the polymerization mixture may be maintained under anaerobic conditions, typically provided by an inert protective gas such as $N_2$, Ar or He.

Regardless of whether a batch, continuous, or semi-continuous process is employed, the polymerization preferably is conducted with moderate to vigorous agitation.

The described polymerization process results in polymer chains that possess reactive (pseudo-living) terminals, which can be further reacted with one or more functionalizing agents so as to provide a polymer with a terminal functionality. These types of polymers can be referred to as functionalized and are distinct from a propagating chain that has not been similarly reacted. In one or more embodiments, reaction between the functionalizing agent and the reactive polymer can proceed via an addition or substitution reaction.

The terminal functionality can be reactive or interactive with other polymer chains (propagating and/or non-propagating) or with other materials in a rubber compound such as particulate reinforcing fillers (e.g., carbon black). As described above, enhanced interactivity between a polymer and particulate fillers in rubber compounds improves the mechanical and dynamic properties of resulting vulcanizates. For example, certain functionalizing agents can impart a terminal functionality that includes a heteroatom to the polymer chain; such a functionalized polymer can be used in rubber compounds from which vulcanizates can be provided, and that vulcanizates can possess high temperature (e.g., 50° C.) hysteresis losses (as indicated by a reduction in high temperature tan δ values) that are less than those possessed by vulcanizates prepared from similar rubber compounds that do not include such functionalized polymers. Reductions in high temperature hysteresis loss can be at least 5%, at least 10%, or even at least 15%.

The functionalizing agent(s) can be introduced after a desired monomer conversion is achieved but prior to introduction of a quenching agent (a compound with a protic H atom) or after the polymerization mixture has been partially quenched. The functionalizing agent can be added to the polymerization mixture after a monomer conversion of at least 5%, at least 10%, at least 20%, at least 50%, or at least 80%. In certain embodiments, the functionalizing agent is added after complete, or substantially complete, monomer conversion. In particular embodiments, a functionalizing agent may be introduced to the polymerization mixture immediately prior to, together with, or after the introduction of a Lewis base as disclosed in U.S. Pat. No. 8,324,329.

Useful functionalizing agents include compounds that, upon reaction, provide a functional group at the end of a polymer chain without joining two or more polymer chains together, as well as compounds that can couple or join two or more polymer chains together via a functional linkage to form a single macromolecule. The ordinarily skilled artisan is familiar with numerous examples of terminal functionalities that can be provided through this type of post-polymerization functionalization with terminating reagents, coupling agents and/or linking agents. For additional details, the interested reader is directed to any of U.S. Pat. Nos. 4,015,061, 4,616,069, 4,906,706, 4,935,471, 4,990,573, 5,064,910, 5,153,159, 5,149,457, 5,196,138, 5,329,005, 5,496,940, 5,502,131, 5,567,815, 5,610,227, 5,663,398, 5,567,784, 5,786,441, 5,844,050, 6,812,295, 6,838,526, 6,992,147, 7,153,919, 7,294,680, 7,642,322, 7,671,136, 7,671,138, 7,732,534, 7,750,087, 7,816,483, 7,879,952, 7,902,309, 8,063,153, 8,088,868, 8,183,324, 8,642,706, etc., as well as references cited in these patents and later publications citing these patents. Specific exemplary functionalizing compounds include metal halides (e.g., $SnCl_4$), $R^3_3SnCl$, $R^3_2SnCl_2$, $R^3SnCl_3$, metalloid halides (e.g., $SiCl_4$), carbodiimides, ketones, aldehydes, esters, quinones, N-cyclic amides, N,N'-disubstituted cyclic ureas, cyclic amides, cyclic ureas, Schiff bases, iso(thio)cyanates, metal ester-carboxylate complexes (e.g., dioxytltin bis(octylmaleate), 4,4'-bis(diethylamino) benzophenone, alkyl thiothiazolines, alkoxysilanes (e.g., $Si(OR^3)_4$, $R^3Si(OR^3)_3$, $R^3_2Si(OR^3)_2$, etc.), cyclic siloxanes, alkoxystannates, and mixtures thereof. (In the foregoing, each $R^3$ independently is a $C_1$-$C_{20}$ alkyl group, $C_3$-$C_{20}$ cycloalkyl group, $C_6$-$C_{ao}$ aryl group, or $C_7$-$C_{20}$ aralkyl group.) Commonly used exemplary functionalizing compounds include $SnCl_4$, tributyl tin chloride, dibutyl tin dichloride, and 1,3-dimethyl-2-imidazolidinone.

The amount of functionalizing agent added to the polymerization mixture can depend on various factors including the amount of Group 3 metal atom-containing compound used, the type of functionalizing agent, the desired level of functionality, etc. In one or more embodiments, the amount of functionalizing agent may be in a range of from ~1 to ~200 moles, commonly from ~5 to ~150 moles, and typically from ~10 to ~100 moles per mole of Group 3 metal atom-containing compound.

Because reactive polymer chains slowly self-terminate at high temperatures, the functionalizing agent can be added to the polymerization mixture when or soon after a peak polymerization temperature is observed or, at least in some embodiments, within 30±10 minutes thereafter. Reaction of these types of compounds with a terminally active polymer can be performed relatively quickly (a few minutes to a few hours) at moderate temperatures (e.g., 0° to 75° C.).

The functionalizing agent can be introduced to the polymerization mixture at a location (e.g., within a vessel) where the polymerization, or at least a portion thereof, has been conducted or at a location distinct therefrom. For example, the functionalizing agent can be introduced to the polymerization mixture in downstream vessels including downstream reactors or tanks, in-line reactors or mixers, extruders, or devolatilizers.

Although not mandatory, if desired, quenching can be performed to inactivate any residual reactive copolymer chains and the catalyst composition. Quenching can be conducted by stirring the polymer and an active hydrogen-containing compound, such as an alcohol or acid, for up to ~120 minutes at temperatures of from 25° to ~150° C. In some embodiments, the quenching agent can include a polyhydroxy compound as disclosed in U.S. Pat. No. 7,879,958. An antioxidant such as 2,6-di-tert-butyl-4-methylphenol (BHT) may be added along with, before, or after the addition of the quenching agent; the amount of antioxidant employed can be from ~0.2 to 1% (by wt.) of the polymer product. The quenching agent and the antioxidant can be added neat or, if necessary, dissolved in a hydrocarbon solvent or liquid monomer prior to being added to the polymerization mixture.

Once polymerization, functionalization (if any) and quenching (if any) are complete, the various constituents of the polymerization mixture can be recovered. Unreacted monomers can be recovered from the polymerization mixture by, for example, distillation or use of a devolatilizer. Recovered monomers can be purified, stored, and/or recycled back to the polymerization process.

The polymer product can be recovered from the polymerization mixture using known techniques. For example, the polymerization mixture can be passed through a heated screw apparatus, such as a desolventizing extruder, in which volatile substances (e.g., low boiling solvents and unreacted monomers) are removed by evaporation at appropriate temperatures (e.g., —100° to ~170° C.) and under atmospheric or sub-atmospheric pressure. Another option involves steam desolvation followed by drying the resulting polymer crumbs in a hot air tunnel. Yet another option involves recovering the polymer directly by drying the polymerization mixture on a drum dryer. Any of the foregoing can be combined with coagulation with water, alcohol or steam; if coagulation is performed, oven drying may be desirable.

Recovered polymer can be grafted with other monomers and/or blended with other polymers (e.g., polyolefins) and additives to form resin compositions useful for various applications. The polymer, regardless of whether further reacted, is particularly suitable for use in the manufacture of various tire components including, but not limited to, tire treads, sidewalls, sub-treads, and bead fillers. It also can be used as a compatibilizer for elastomeric blends and/or used in the manufacture of hoses, belts, shoe soles, window seals, other seals, vibration damping rubber, and other industrial or consumer products.

When the resulting polymer is utilized in a tread stock compound, it can be used alone or blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in J. Am. Chem. Soc., vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of 1 to 100 phr, commonly in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with 5 to 40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents generally include a functional group capable of bonding physically and/or chemically with a group on the surface of the silica filler (e.g., surface silanol groups) and a functional group capable of bonding with the elastomer, e.g., via a sulfur-containing linkage. Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) and polyorganosiloxanes. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All ingredients can be mixed using standard equipment such as, e.g., Banbury or Brabender mixers. Typically, mixing occurs in two or more stages. During the first stage (often referred to as the masterbatch stage), mixing typically is begun at temperatures of 120° to 130° C. and increases until a so-called drop temperature, typically 163°±3° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, Encyclopedia of Chem. Tech., 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The preceding description has been written so that individual elements are described separately. However, unless an explicit prohibition is provided in the text, this should not be read as limiting the combinability of those individual elements; in fact, to the contrary, combinations of any such combinable elements are expressly permitted.

The following non-limiting, illustrative examples provide the reader with detailed conditions and materials that can be useful in the practice of the present invention.

EXAMPLES

Examples 1-8: 2,6-Dimethylpyridine as Modifier

To 8 dry, 750 mL bottles purged with $N_2$ were added sufficient butadiene solution (~20% by wt. in hexane) and hexanes so as to provide 333 g of a 14% butadiene solution, 3.19 mL trihydrocarbylaluminum (1.0 M in hexanes), and 1.64 mL of a neodymium carboxylate of Versatic™ acid (hereinafter "$NdV_3$") solution (0.054 M in hexanes). After 3 minutes, 1.75 mL ethylaluminum dichloride (1.09 M in hexanes) was added to each bottle, followed by varying amounts of 2,6-dimethylpyridine (0.4 M in hexanes).

The bottles were placed in a 80° C. agitating water bath for ~60 minutes. (The bottle containing no 2,6-dimethylpyridine was polymerized for only 30 minutes.)

The resulting polymer cements were quenched with 4 mL of a 4% (w/w)) solution of BHR. Coagulation was performed in 8 L isopropanol containing 15 g BHT, and the recovered polymers were drum dried at 120° C.

The properties of these polymers are summarized below in Table 1, with molecular weight data being obtained via GPC (using a Ecosec™ HLC-8320GPC system (Tosoh Bioscience; King of Prussia, Pa.) with TSKgel $GMH_{XL}$-BS columns (Tosoh) and THF as solvent) and microstructure values by FTIR, as described above.

TABLE 1

| Catalyst information and polymer properties for Examples 1-8 | | | | | | | | |
|---|---|---|---|---|---|---|---|---|
| | 1 | 2 | 3 | 4 | 5 | 6 | 7 | 8 |
| ratio, pyridine-to-Nd (x:1) | 0 | 0.25 | 0.5 | 0.75 | 1.0 | 2.0 | 5.0 | 10.0 |
| monomer conversion (%) | 93.6 | 90.6 | 87.0 | 74.6 | 63.4 | 35.1 | 21.9 | 11.8 |
| $ML_{1+4}$ @ 100° C. (Mooney units) | 19.8 | 18.5 | 19.1 | 18.0 | 20.8 | — | — | — |
| $t_{80}$ (sec) | 3.38 | 3.63 | 3.34 | 4.06 | 1.05 | — | — | — |
| $M_n$ (kg/mol) | 139 | 130 | 134 | 118 | 131 | 98 | 87 | 56 |
| $M_w/M_n$ | 3.41 | 3.67 | 3.87 | 4.71 | 4.45 | 5.06 | 6.22 | 11.47 |
| vinyl (%) | 0.8 | 0.9 | 0.9 | 0.8 | 0.9 | 1.0 | 1.0 | 1.2 |
| cis-1,4 configuration (%) | 96.2 | 97.3 | 97.4 | 97.7 | 97.8 | 97.8 | 97.7 | 97.4 |
| trans-1,4 configuration (%) | 3.0 | 1.9 | 1.8 | 1.5 | 1.3 | 1.2 | 1.2 | 1.4 |
| general formula (II) calculations | | | | | | | | |
| z = 13 | — | 11.3 | 12 | 3.5 | -6.4 | -34.7 | -49.2 | -63.2 |
| z = 13.5 | — | 11.85 | 12.6 | 4.25 | -5.6 | -33.9 | -48.45 | -62.6 |
| z = 14 | — | 12.4 | 13.2 | 5 | -4.8 | -33.1 | -47.7 | -62 |
| z = 14.5 | — | 12.95 | 13.8 | 5.75 | -4 | -32.3 | -46.95 | -61.4 |
| z = 15 | — | 13.5 | 14.4 | 6.5 | -3.2 | -31.5 | -46.2 | -60.8 |

TABLE 1-continued

Catalyst information and polymer properties for Examples 1-8

|  | 1 | 2 | 3 | 4 | 5 | 6 | 7 | 8 |
|---|---|---|---|---|---|---|---|---|
| z = 15.5 | — | 14.05 | 15 | 7.25 | −2.4 | −30.7 | −45.45 | −60.2 |
| z = 16 | — | 14.6 | 15.6 | 8 | −1.6 | −29.9 | −44.7 | −59.6 |
| z = 16.5 | — | 15.15 | 16.2 | 8.75 | −0.8 | −29.1 | −43.95 | −59 |
| z = 17 | — | 15.7 | 16.8 | 9.5 | 0 | −28.3 | −43.2 | −58.4 |
| z = 17.5 | — | 16.25 | 17.4 | 10.25 | 0.8 | −27.5 | −42.45 | −57.8 |
| z = 18 | — | 16.8 | 18 | 11 | 1.6 | −26.7 | −41.7 | −57.2 |
| z = 20 | — | 19 | 20.4 | 14 | 4.8 | −23.5 | −38.7 | −54.8 |

Examples 2-4 display acceptable general formula (II) results at each z value, while Example 5 provides an acceptable result at z≥17. None of Examples 5-8 display acceptable results at any of the z values.

Examples 9-13: Pyridine as Modifier

The procedure described in Examples 1-8 was essentially repeated, with the exception that pyridine was used in place of 2,6-dimethylpyridine.

The properties of the resulting polymers are summarized below in Table 2.

TABLE 2

Catalyst information and polymer properties for Examples 9-13

|  | 9 | 10 | 11 | 12 | 13 |
|---|---|---|---|---|---|
| ratio, pyridine-to-Nd (x:1) | 0 | 10 | 20 | 30 | 40 |
| monomer conversion (%) | 91.2 | 99.5 | 87.7 | 67.0 | 6.0 |
| $ML_{1+4}$ @ 100° C. (Mooney units) | 18.5 | 20.0 | 18.0 | 45.5 | — |
| $t_{80}$ (sec) | 3.21 | 3.21 | 3.18 | 3.37 | — |
| $M_n$ (kg/mol) | 373 | 382 | 424 | 673 | 693 |
| $M_w/M_n$ | 3.19 | 3.28 | 3.83 | 4.37 | 10.16 |
| vinyl (%) | 0.8 | 0.8 | 0.8 | 0.9 | 1.0 |
| cis-1,4 configuration (%) | 96.4 | 97.0 | 98.0 | 98.3 | 98.4 |
| trans-1,4 configuration (%) | 2.8 | 2.2 | 1.2 | 0.8 | 0.7 |
| general formula (II) calculations |  |  |  |  |  |
| z = 13 | — | 16.1 | 17.3 | 0.5 | −59.2 |
| z = 13.5 | — | 16.4 | 18.1 | 1.45 | −58.2 |
| z = 14 | — | 16.7 | 18.9 | 2.4 | −57.2 |
| z = 14.5 | — | 17 | 19.7 | 3.35 | −56.2 |
| z = 15 | — | 17.3 | 20.5 | 4.3 | −55.2 |
| z = 15.5 | — | 17.6 | 21.3 | 5.25 | −54.2 |
| z = 16 | — | 17.9 | 22.1 | 6.2 | −53.2 |
| z = 16.5 | — | 18.2 | 22.9 | 7.15 | −52.2 |
| z = 17 | — | 18.5 | 23.7 | 8.1 | −51.2 |
| z = 17.5 | — | 18.8 | 24.5 | 9.05 | −50.2 |
| z = 18 | — | 19.1 | 25.3 | 10 | −49.2 |
| z = 20 | — | 20.3 | 28.5 | 13.8 | −45.2 |

Examples 10-12 display acceptable general formula (II) results at each z value, while Example 13 does not display an acceptable result at any z value.

Examples 14-26: Other Lewis Bases as Modifier

A $N_2$-purged, jacketed steel reactor was repeatedly charged with anhydrous hexanes and a sufficient amount of 1,3-butadiene solution (in hexanes) to make ~4.4 kg (9.8 lb.) of a 1,3-butadiene solution (14%). To each was added the amount and type of Lewis base set forth below in Tables 3a and 3b. The jacket temperature of the reactor was set to 38° C. (100° F.), and the reactor was allowed to equilibrate while the catalyst composition described immediately below was being prepared.

A 355 mL (12 oz.), $N_2$-purged glass bottle was charged with ~65 g of a 1,3-butadiene solution (20% in hexane), followed by 7.42 mL trihydrocarbylaluminum solution (1.03 M in hexanes) was added, 4.22 mL diisobutyl-aluminum hydride solution (1.08 M) and 2.15 mL $NdV_3$ solution (0.56 M). This solution was allowed to rest for ~3 minutes before 1.79 mL ethylaluminum dichloride solution (1.06 M) was added.

The catalyst solution was rapidly added to the reactor before the jacket temperature was adjusted to 99° C. (210° F.). At 60 minutes after catalyst charge, the jacket temperature was dropped to ~4° C. (40° F.) to cool the polymer cement and, 20 minutes thereafter, a small sample of the polymer cement was collected in a bottle.

For each polymerization, conversion was determined by evaporating a pre-weighed quantity of the cement and thereby determining the percent solids of the cement compared to the 14% (w/w) butadiene in the reactor prior to polymerization.

Coagulation, recovery and testing were done as described above in connection with Examples 1-8, with the properties of each polymer being tabulated immediately below (where "Py" represents pyridine and "OOA" represents an oligomeric oxolanyl alkane).

TABLE 3a

Catalyst information and polymer properties for Examples 14-20

|  | 14 | 15 | 16 | 17 | 18 | 19 | 20 |
|---|---|---|---|---|---|---|---|
| Lewis base | n/a | Py | Py | EHA | EHA | TBC | TBC |
| ratio, Lewis base-to-Nd (x:1) | 0 | 1 | 2.5 | 0.5 | 2.5 | 0.1 | 0.5 |
| monomer conversion (%) | 91.8 | 89.4 | 83.4 | 88.4 | 69.9 | 83.9 | 81.3 |
| $ML_{1+4}$ @ 100° C. (Mooney units) | 50.3 | 36.9 | 34.8 | 39.9 | 57.6 | 37.8 | 26.3 |
| $t_{80}$ (sec) | 3.7 | 3.2 | 3.7 | 2.6 | 2.9 | 2.4 | 2.6 |
| $M_n$ (kg/mol) | 202 | 175 | 188 | 201 | 241 | 201 | 168 |
| $M_w/M_n$ | 3.09 | 3.46 | 3.29 | 3.46 | 3.99 | 3.24 | 3.92 |
| vinyl (%) | 0.8 | 0.8 | 0.8 | 0.7 | 0.8 | 0.7 | 0.8 |
| cis-1,4 configuration (%) | 97.2 | 97.5 | 97.6 | 97.3 | 98.1 | 96.9 | 97.6 |
| trans-1,4 configuration (%) | 2.1 | 1.7 | 1.6 | 2.0 | 1.1 | 0.7 | 0.8 |

TABLE 3b

Catalyst information and polymer properties for Examples 21-26

|  | 21 | 22 | 23 | 24 | 25 | 26 |
|---|---|---|---|---|---|---|
| Lewis base | TNPP | TNPP | TNPP | OOA | OOA | OOA |
| ratio, Lewis base-to-Nd (x:1) | 0.1 | 0.25 | 0.5 | 0.025 | 0.05 | 0.1 |
| monomer conversion (%) | 94.7 | 90.0 | 75.5 | 87.9 | 85.7 | 75.9 |
| $ML_{1+4}$ @ 100° C. (Mooney units) | 43.9 | 38.6 | 34.6 | 45.1 | 25.9 | 31.6 |
| $t_{80}$ (sec) | 3.0 | 2.7 | 2.7 | 3.7 | 2.4 | 2.6 |
| $M_n$ (kg/mol) | 208 | 196 | 178 | 200 | 168 | 183 |

TABLE 3b-continued

Catalyst information and polymer properties for Examples 21-26

|  | 21 | 22 | 23 | 24 | 25 | 26 |
|---|---|---|---|---|---|---|
| $M_w/M_n$ | 692 | 687 | 712 | 3.43 | 3.73 | 3.93 |
| vinyl (%) | 0.7 | 0.7 | 0.8 | 0.7 | 0.7 | 0.7 |
| cis-1,4 configuration (%) | 96.8 | 97.4 | 97.7 | 97.1 | 97.7 | 97.9 |
| trans-1,4 configuration (%) | 2.5 | 1.9 | 1.5 | 2.3 | 1.6 | 1.4 |

Examples 27-31: Pyridine in Continuous Polymerization

Two 76 L (20 gallons) reactors were connected in series as a proxy for a continuous polymerization system.

The following materials were metered as the catalyst stream through a static mixer and then through the bottom of the first reactor:
21.030 kg/hr hexanes;
7.422 kg/hr 1,3-butadiene solution (23.1% in hexane);
0.107 kg/hr of 50% hexanes mixed with 50% $NdV_3$ solution (8.8% Nd metal as $NdV_3$ in hexanes);
0.274 kg/hr of a 2:1 mixture of trihydrocarbylaluminum and diisobutyl-aluminum hydride (20% in hexane); and
0.047 kg/hr of ethylaluminum dichloride solution (15% in hexane).

Additionally, different amounts of pyridine solutions (each in hexane) were metered into the first reactor:
Ex. 27—none
Ex. 28—0.050 kg/hr of a 10% solution
Ex. 29—0.030 kg/hr of a 10% solution
Ex. 30—0.060 kg/hr of a 2.5% solution
Ex. 31—0.038 kg/hr of a 2.5% solution Via a separate stream, 66.802 kg/hr 1,3-butadiene solution (23.1% in hexane) also was fed into the bottom of the first reactor.

The polymer cement made in the first reactor was continuously fed to the second reactor, into the side of which was metered 0.120 kg/hr of a dioctyltin bis(2-ethylhexylmaleate) mixture (5% in hexane) as a coupling agent.

The output of the second reactor was fed continuously to a collection vessel containing a hexane/isopropanol mixture.

Reactor jacket temperatures were adjusted to keep the internal temperatures at a level to support 80-100% conversion of monomer into polymer at the end of the second reactor. Additionally, the trihydrocarbylaluminum/diisobutyl-aluminum hydride levels were adjusted to achieve a polymer Mooney viscosity ranging from ~20 to ~32 in the first reactor. (The polymer Mooney in the second reactor, after coupling ranged from ~30 to ~45.)

Conversion and 1,4-cis percentages are tabulated below.

TABLE 4

|  | Conversion (%) | | 1,4-cis mer % | |
|---|---|---|---|---|
|  | 1st reactor | 2nd reactor | 1st reactor | 2nd reactor |
| 27 | 98.0 | 99.4 | 95.7 | 93.1 |
| 28 | 86.9 | 94.5 | 97.5 | 97.6 |
| 29 | 88.7 | 97.9 | 97.3 | 96.5 |
| 30 | 88.8 | 96.4 | 97.2 | 96.9 |
| 31 | 91.0 | 97.4 | 97.3 | 96.4 |

Examples 32-37: OOA in Continuous Polymerization

The procedure from Examples 27-31 was repeated with appropriate adjustments to the various feeds.

In the first reactor, the amount/rate of solvent and monomer feed was adjusted as follows:
18.711 kg/hr hexanes; and
7.654 kg/hr 1,3-butadiene solution (22.4% in hexane).

The amounts of OOA solutions (each in hexane) were as follows:
Ex. 32— none
Ex. 33-0.060 kg/hr of a 0.10% solution
Ex. 34-0.060 kg/hr of a 0.05% solution
Ex. 35— none
Ex. 36-0.060 kg/hr of a 0.025% solution
Ex. 37-0.030 kg/hr of a 0.10% solution Via a separate stream, 68.889 kg/hr 1,3-butadiene solution (22.4% in hexane) also was fed into the bottom of the first reactor.

The polymer cement made in the first reactor was continuously fed to the second reactor, into the side of which was metered 0.069 kg/hr of a dioctyltin bis(2-ethylhexylmaleate) mixture (10% in hexane) as a coupling agent.

The output of the second reactor was fed continuously to a collection vessel containing a hexane/isopropanol mixture.

Reactor jacket temperatures and trihydrocarbylaluminum/diisobutyl-aluminum hydride levels were adjusted similarly to those from Examples 27-31.

Conversion and 1,4-cis percentages are tabulated below.

TABLE 5

|  | Conversion (%) | | 1,4-cis mer % | |
|---|---|---|---|---|
|  | 1st reactor | 2nd reactor | 1st reactor | 2nd reactor |
| 32 | — | 95.8 | 97.2 | 97.1 |
| 33 | 81.6 | 88.8 | 98.1 | 98.0 |
| 34 | 79.8 | 91.7 | 97.9 | 97.4 |
| 35 | 91.1 | 95.4 | 97.6 | 97.5 |
| 36 | 81.5 | 84.1 | 98.4 | 99.0 |
| 37 | 75.5 | 81.1 | 98.4 | 97.8 |

That which is claimed is:

1. A process for providing a polymer from monomers that comprise at least one polyene, said process comprising:
   contacting, in one or more organic liquids, said monomers with a catalyst composition and allowing them to polymerize,
   wherein said catalyst composition comprises a compound that comprises a Group 3 metal atom-containing carboxylate, a catalyst activator, a compound that comprises a halogen atom, and a Lewis base, wherein a molar ratio of Lewis base to Group 3 metal atom is less than 1:1 to 1:30;
   the Lewis base is selected from the group consisting of: 2,6-dialkylpyridine, oligomeric oxolanyl alkane, 2-ethylhexanoic acid (EHA), tri(nonylphenyl)phosphite, and combinations thereof.

2. The process of claim 1 wherein said at least one polyene comprises one or more conjugated dienes.

3. The process of claim 2 wherein said at least one polyene consists of one or more conjugated dienes.

4. The process of claim 1 wherein said molar ratio is no more than 1:2.

5. The process of claim 4 wherein said molar ratio is no more than 1:5.

6. The process of claim 5 wherein said molar ratio is no more than 1:10.

7. The process of claim 1 wherein a concentration of said monomers in said one or more organic liquids is from 5 to 25 weight percent.

8. The process of claim 1 wherein said Group 3 metal atom is a lanthanide.

9. The process of claim 8 wherein said lanthanide is neodymium.

10. A process for providing a polymer from conjugated diene monomers, said process comprising contacting, in one or more organic liquids, said monomers with a catalyst composition and allowing them to polymerize, wherein said catalyst composition comprises a compound that comprises a lanthanide carboxylate, a catalyst activator, a compound that comprises a halogen atom, and a Lewis base, wherein a molar ratio of Lewis base to lanthanide is no more than 5:2; and the Lewis base is selected from the group consisting of: 2,6-dialkylpyridine, oligomeric oxolanyl alkane, 2-ethylhexanoic acid (EHA), tri(nonylphenyl)phosphite, and combinations thereof.

11. The process of claim 10 wherein said catalyst activator comprises at least one of a trihydrocarbylaluminum, a dihydrocarbylaluminum hydride, and a hydrocarbylaluminum dihydride.

12. The process of claim 10 wherein said catalyst activator comprises a trihydrocarbylaluminum and a dihydrocarbylaluminum hydride.

13. The process of claim 10 wherein said molar ratio is 1:1 to 1:30.

14. The process of claim 10 wherein a concentration of said monomers in said one or more organic liquids is from 5 to 25 weight percent.

15. A process for providing a polymer from 1,3-butadiene, said process comprising:

contacting, in one or more organic liquids, said 1,3-butadiene with a catalyst composition that comprises a compound that comprises a neodymium carboxylate, an alkylating agent that consists of a trihydrocarbylaluminum and a dihydrocarbylaluminum hydride, a compound that comprises a halogen atom, and a Lewis base, wherein a molar ratio of Lewis base to neodymium is no more than 5:2; and the Lewis base is selected from the group consisting of: 2,6-dialkylpyridine, oligomeric oxolanyl alkane, 2-ethylhexanoic acid (EHA), tri(nonylphenyl)phosphite, and combinations thereof.

16. The process of claim 15 wherein a concentration of 1,3-butadiene in said one or more organic liquids is from 5 to 25 weight percent.

17. The process of claim 1, wherein the amount of the Group 3 metal atom-containing carboxylate is about 0.005 to about 2 mmol.

18. The process of claim 1, wherein the Lewis base is added as a separate component after the Group 3 metal atom-containing carboxylate, the catalyst activator, and the compound that comprises a halogen atom is added.

* * * * *